United States Patent [19]

Falzoni

[11] Patent Number: 4,685,604

[45] Date of Patent: Aug. 11, 1987

[54] MULTI-USE MACHINE FOR THE APPLICATION OF SMALL METALLIC AND NON-METALLIC WORKPIECES OR ITEMS AND WITH TOTAL INTERCHANGEABILITY OF EQUIPMENT AND RELATED FITTINGS

[75] Inventor: Pierino Falzoni, Cilavagna, Italy

[73] Assignee: Officina Meccanica Fratelli Falzoni S.d.f., Cilavegna, Italy

[21] Appl. No.: 723,038

[22] Filed: Apr. 15, 1985

Related U.S. Application Data

[63] Continuation-in-part of Ser. No. 357,228, Mar. 11, 1982, abandoned.

[30] Foreign Application Priority Data

Mar. 18, 1981 [IT] Italy ............................ 20400 A/81

[51] Int. Cl.$^4$ ............................................ A41H 37/10
[52] U.S. Cl. ..................................... 227/18; 227/120; 227/45; 227/48
[58] Field of Search ...................... 227/18, 32, 38, 129, 227/134, 45, 48, 120

[56] References Cited

U.S. PATENT DOCUMENTS

| 3,750,925 | 8/1973 | Schmidt et al. | 227/18 |
| 4,199,094 | 4/1980 | Birkhoffer et al. | 227/48 X |
| 4,247,032 | 1/1981 | Stanik | 227/18 |
| 4,278,194 | 7/1981 | Ersoy | 227/18 |

Primary Examiner—E. R. Kazenske
Assistant Examiner—William Fridie
Attorney, Agent, or Firm—Collard, Roe & Galgano

[57] ABSTRACT

There is provided a multi-purpose machine for the application of small metallic or non-metallic workpieces, or items which can be mounted on a proper support, or on a suitable table, or at a processing line and includes a head with a fixed tool holder and a movable tool holder and a universal presser. The tool holders are adapted for carrying the pairs of tools in a removable, immediately interchangeable manner for the functions, or processes of various applications such as branding, drilling, eyelet punching, blanking or die cutting, riveting and the like. The machine may be mechanically operated by simple linkages, pneumatically by means of a pedal operation, or electrically.

4 Claims, 10 Drawing Figures

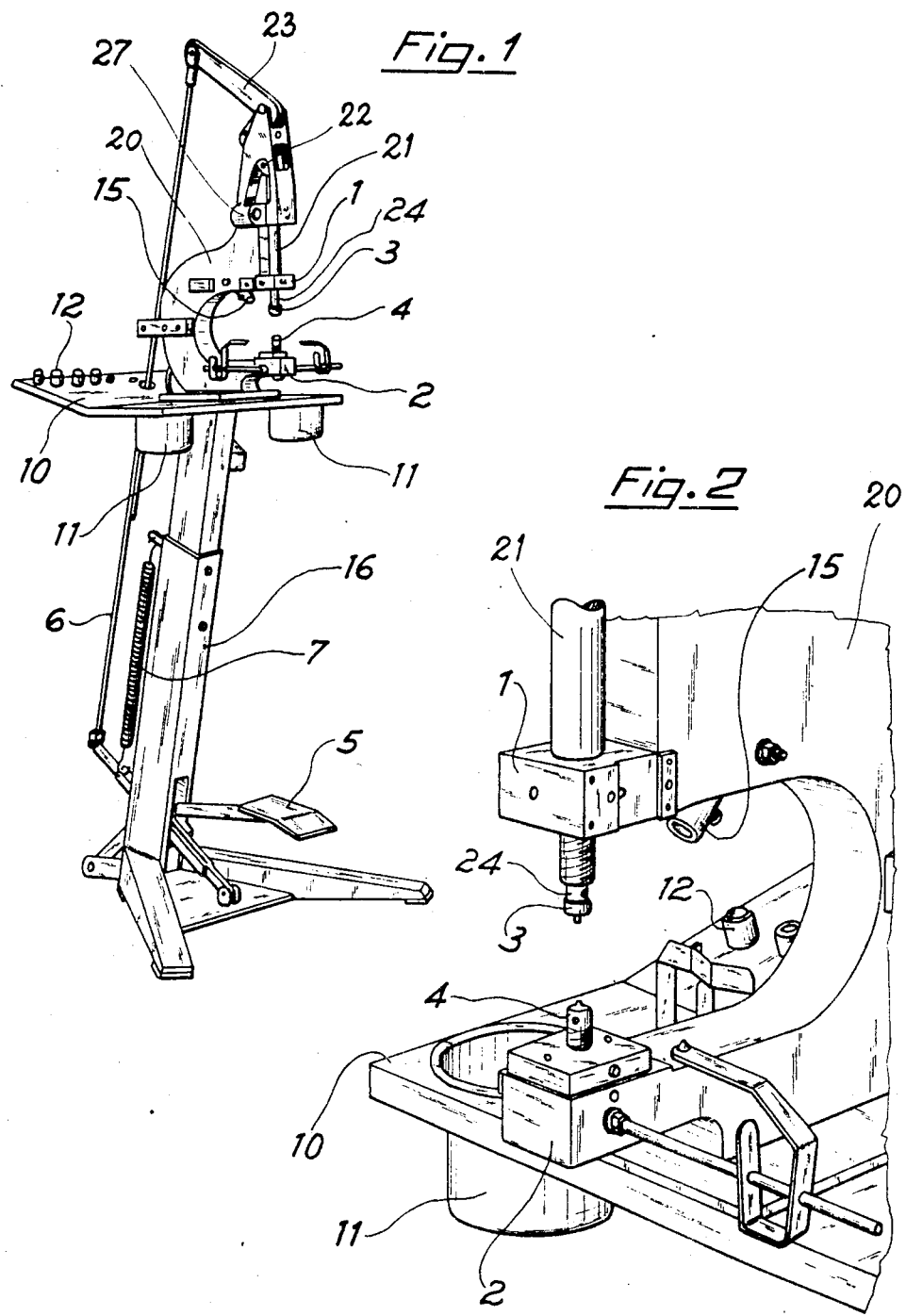

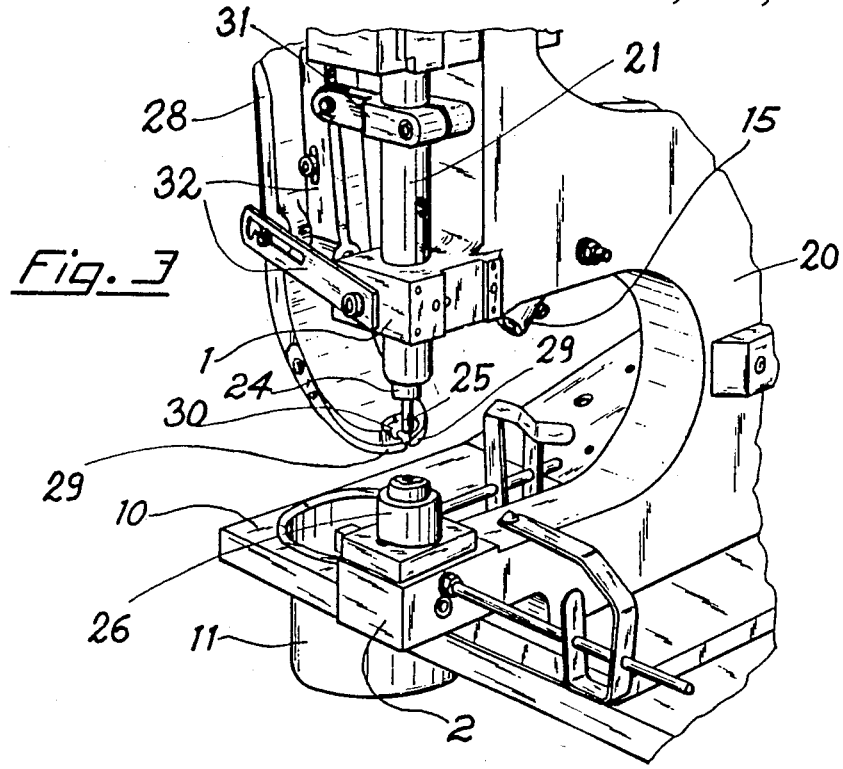
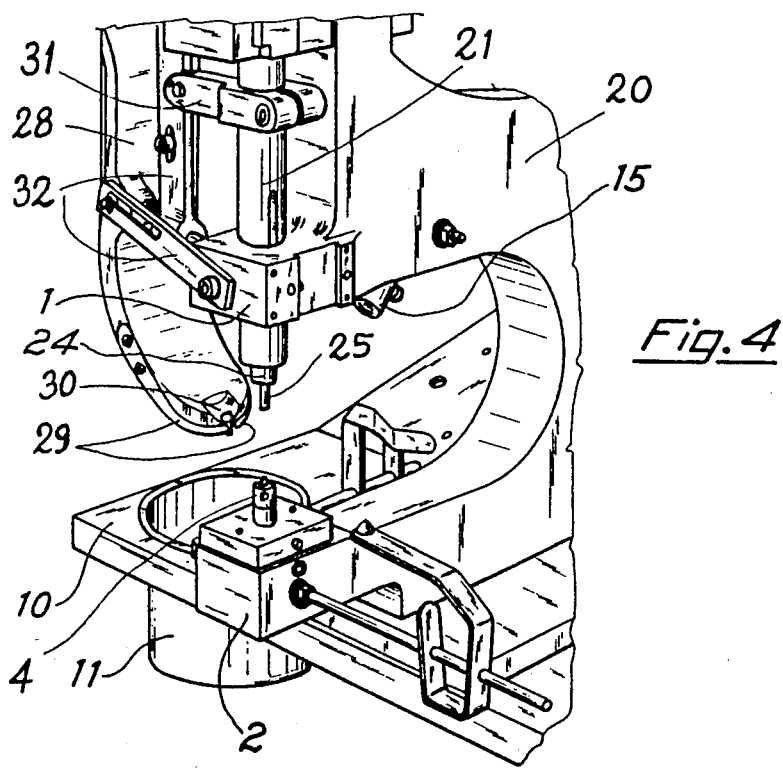

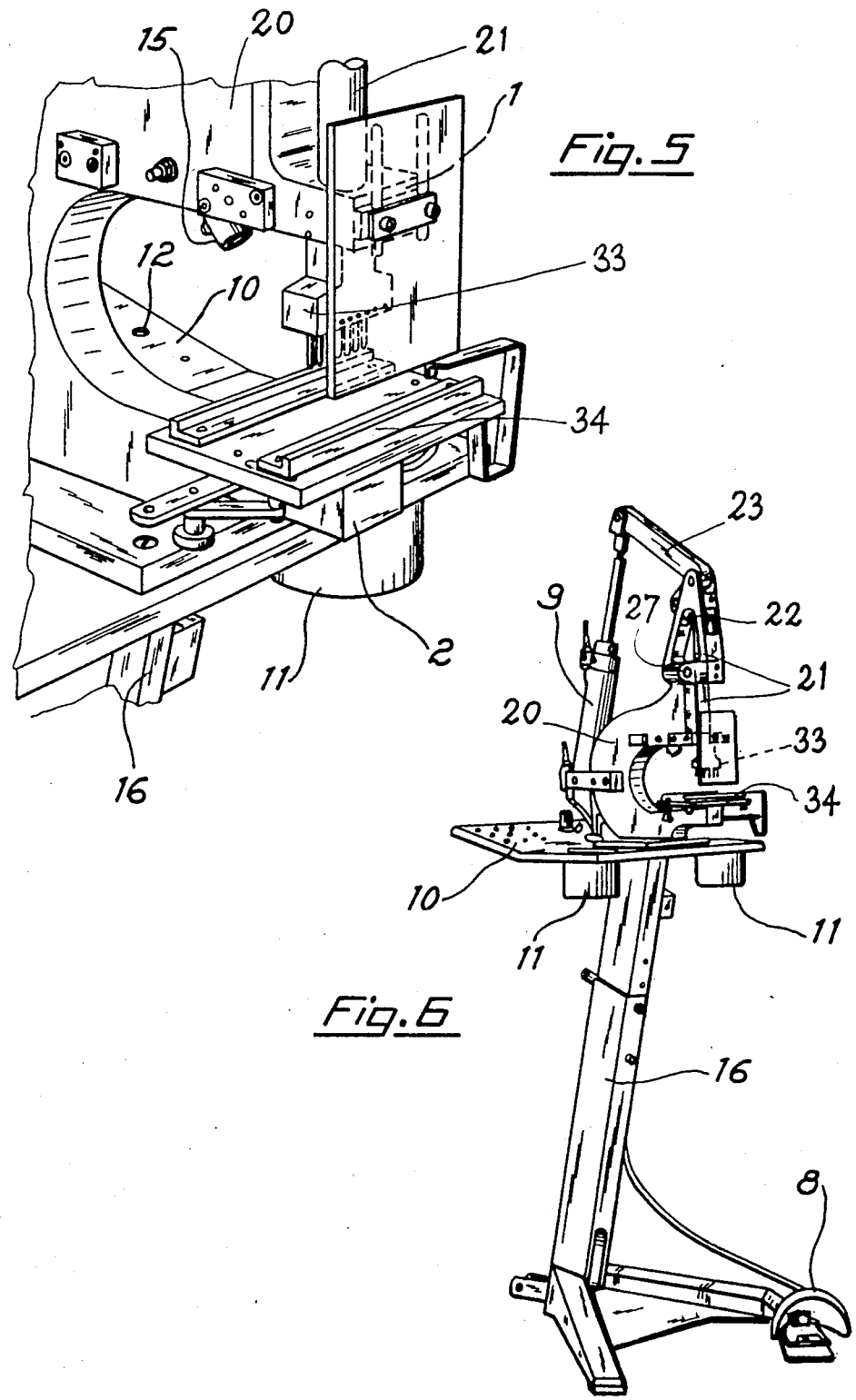

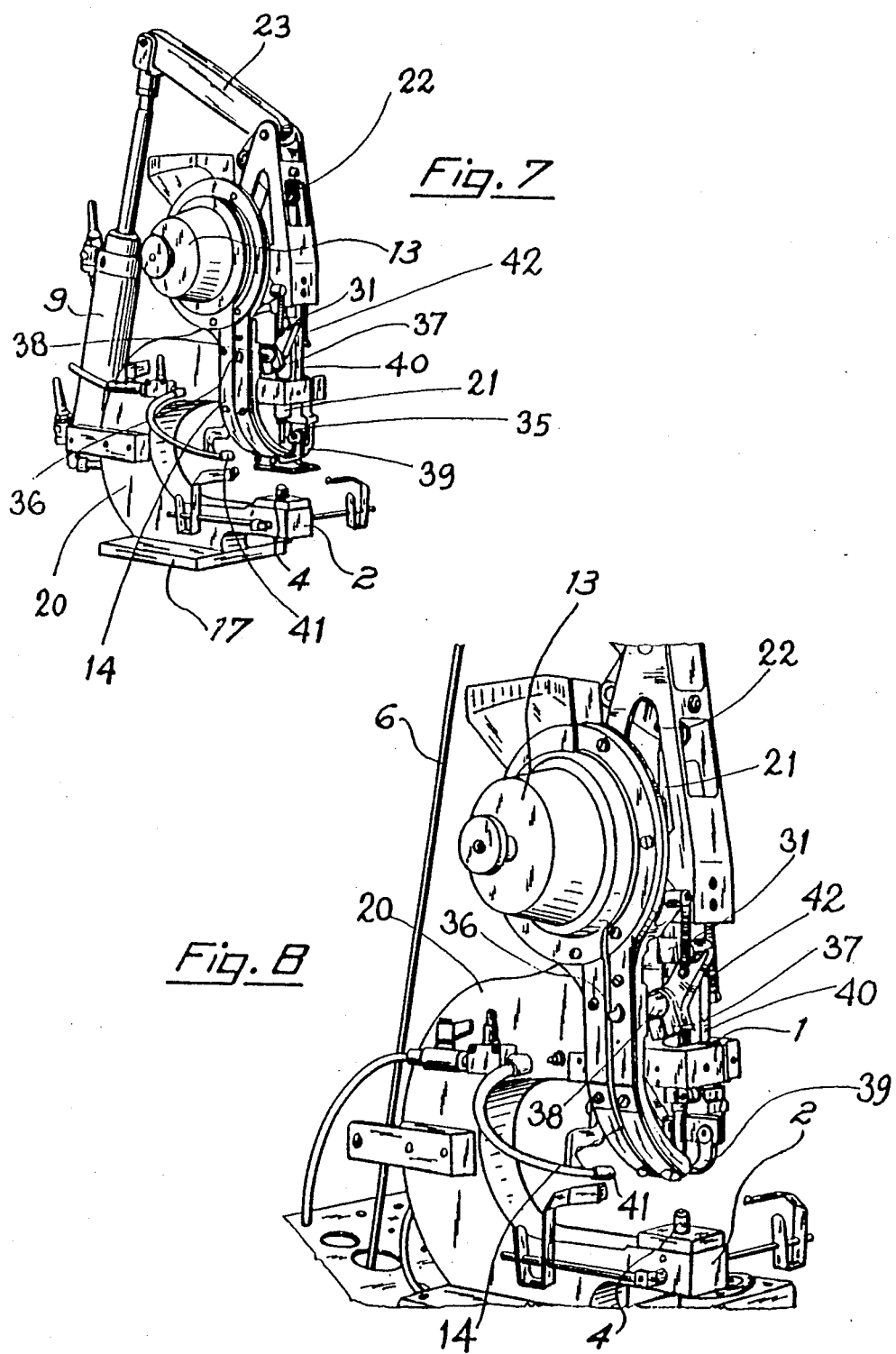

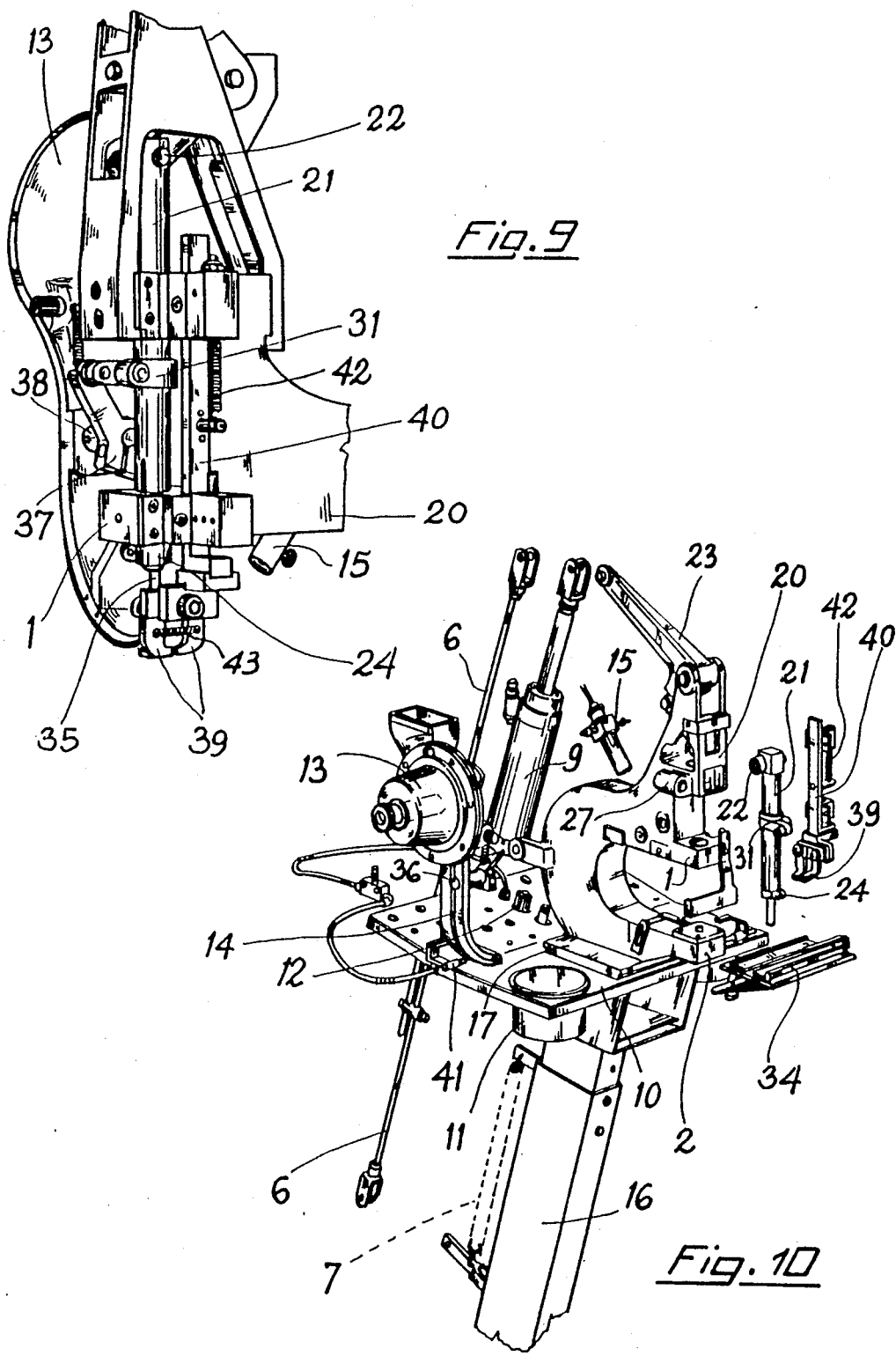

MULTI-USE MACHINE FOR THE APPLICATION OF SMALL METALLIC AND NON-METALLIC WORKPIECES OR ITEMS AND WITH TOTAL INTERCHANGEABILITY OF EQUIPMENT AND RELATED FITTINGS

REFERENCE TO EARLIER APPLICATION

This application is a continuation in part of my earlier filed U.S. patent application Ser. No. 357,228 filed on Mar. 11, 1982 now abandoned.

BACKGROUND OF THE INVENTION

1. Field of the invention

The present invention relates to a multi-purpose machine for the application of small metallic and non-metallic workpieces or items, which machine is capable of performing functions which hitherto have been accomplished by several or various machines.

2. Description of the Prior Art

In order to apply small metallic workpieces or items, it has heretofore been necessary to utilize a series of machines having particular capabilities and specially designed for each application such as riveting, blanking or die cutting, eyelet punching, attaching of pressure buttons, attaching of studs or other ornamental outfits, cutting with contemporaneous riveting, etc.

Previously, and still in some cases today, such operations had been manually done with the aid of simple tools. Many such manual operations have been replaced by mechanical systems which facilitate such operations, but nevertheless perform only a single operation per machine, thus requiring a series of machine tools for the various functions.

SUMMARY OF THE INVENTION

It is, therefore, an object of the present invention to provide a multi-purpose machine for the application of small metallic and non-metallic workpieces or items wherein the machine is provided with a head for receiving or accomodating all the necessary fittings and equipment. Such a machine accomplishes this by means of simple assembling of the individual tools which can be effected at any time and without requiring special operations.

Conceptually, the machine is very simple and includes an operating head or presser which assembles as much as possible all of the elements relating to the particular functions or processes, rationally arranging such elements so that the work function is accomplished more quickly. This operating head is mounted on a pedestal which is adjustable in height and has at the top a working plane provided with housings to accommodate the implements or fixtures and the operating means.

The small workpieces or items which are to be processed or which have been processed are collected within containers recessed in the working plane and are constructed of transparent material to easily check the contents thereof and are easily removable to enable the emptying and filling thereof.

It should be noted that such machine heads could also be provided without pedestals and manufactured with milled guides for line assembly on work planes at varying or predetermined heights.

In addition to the interchangeability of tools and related fittings, the machine can be adapted to be operated mechanically by levers and rudder bar, or pneumatically by means of a suitable pedal, or electrically. At present, the operating functions which can be performed by the machine are a simple platen, such as a branding, blanking or die casting, eyelet punching by drilling or otherwise and riveting, etc.

The quick locking, self-centering pliers or tool holder provided with the machine serve to quickly fix in place the interchangeable tools, etc. The various available fittings to complete the machine are an optical positioning projector which serves as a guide for the correct seating of the article to be processed, as well as a supply of specially designed punches for any possible use.

It is to be noted that the functions of a machine according to the present concept can be expanded and added to with new tools and fittings as required for additional functions or processes.

DESCRIPTION OF THE DRAWINGS

The machine according to the present invention will be described and understood more readily when considered together with the accompanying drawings, in which:

FIG. 1 is a perspective view of a machine according to the present invention showing a simple mechanical platen;

FIG. 2 is a perspective view of the machine according to the present invention showing the operating detail of the platen;

FIG. 3 is a perspective view of the inventive machine showing the operating detail of a head including a mechanical drilling eyelet punching device;

FIG. 4 is a perspective view of the inventive machine showing the operating detail of a head with a non-driling eyelet punching device;

FIG. 5 is a perspective view of the inventive machine showing the operating detail for a head having a pneumatic blanking or die casting device;

FIG. 6 is a perspective view of the machine of FIG. 5 showing the supporting pedestal;

FIG. 7 is a perspective view of the inventive machine showing a pneumatic bench riveting device;

FIG. 8 is a perspective view of the inventive machine showing the operating detail for a head with a mechanical riveting device;

FIG. 9 is a perspective view of the machine of FIG. 8, taken from the opposite side, and FIG. 10 is an exploded view of the inventive machine showing all the parts consituting the head and some interchangeable tools.

DESCRIPTION OF THE PREFERRED EMBODIMENTS

Now turning to the drawings, a machine is shown therein according to the present invention wherein the presser is the common essential element that substantially comprises a head 20 configured to have two supports or mountings, designated 1 and 2, that is upper and lower supports or mountings, respectively. At the front of the presser, the opposing tools are disposed between the two supports or mountings in pairs to effect the various characteristic functions or processes of the machine.

The upper support or mounting 1 usually carries a punch 3, which is upwardly and downwardly moved while the lower support or mounting 2 carriers the fixed but adjustable matrix or die 4. The downward movement of the punch is effected by the operator while the upward movement thereof is a simple return movement.

As seen in FIG. 1, the downward movement can be caused by a suitable pedal which operates the transmission rod 6 and the return movement caused by the biasing action of spring 7 where the operation is accomplished by means of a mechanical system. In the case of pneumatic operation, the operator causes the machine to function by acting upon pedal 8 (FIG. 6) which controls the pneumatic device 9. Work plane 10, located beneath the head 20, has at least one pair of sockets 11 which preferably are transparent and which can be removed and replaced again in the seats thereof. The sockets 11 act as containers for the small metallic and non-metallic workpieces or items which are to be worked on.

Seats 12 are also formed on the work plane 10 for the purpose of holding various tools when not in use, such as punches, dies and the like.

In the rivet and eyelet punch machines there could also be mounted reservoirs or feedings, designated 13, for the small workpieces or items made of transparent material and provided with a feed channel 14 (see FIGS. 7 and 8). On request, all the machines are supplied with an optical positioning projector 15.

Bench heads, designated 17 in FIG. 7, are also provided which are supported by the adjustable pedestals 16 which can be mounted on further supports or mountings.

A mobile shaft 21, hinged at its upper end 22 to a control lever 23, operated by the transmission rod 6, is inserted in the head 20 of the upper support 1.

The various tools are fixed to the lower end 24 of the mobile shaft aligned with the fixed matrixes applied to the lower support 2, as a function of the operation that the machine must perform.

Hence, by replacing the tools and matrixes with others the machine can perform completely different functions, such as for example, branding, punching, eyelet punching, die-cutting, riveting, simultaneous punching and riveting, application of studs and/or similar accessories, etc.

FIGS. 1 and 2 illustrate the machine, subject of the present invention, when it performs the punching function. In this case a punch 3 is fixed to the lower end 24 of the mobile shaft 21, while the lower support 2 carries the matrix, or die 4.

FIG. 3 illustrates the machine, subject of this invention when it performs the eyelet punching function.

In this embodiment the end 24 of the mobile shaft carries a piercing punch 25, the lower support carries a matrix 26 with a through hole, possibly supported by an elastic base and on the side part of the head 20 a rivet feeder is balanced on a fulcrum 27 (see FIG. 10).

By replacing the matrix 26 having a through hole with the matrix 4 of FIG. 1 which has no hole an eyelet punching machine is obtained that is not piercing as illustrated in FIG. 4.

The rivet feeder is of the continuous drop type and includes a feed channel 28 for the rivets fitted with rivet retention springs 29 arranged at the sides of the discharge 30 of the said channel.

The said feeder is fixed to the mobile shaft 21, via a bracket 31 and is hinged to the upper support 1 via levers 32. During the descent the mobile shaft 21, via the bracket 31 and the levers 32, moves the channel 28 discharge 30 from a side position, as illustrated in FIG. 4, to a position aligned with the piercing punch 25, as illustrated in FIG. 3. Thus, the punch 25 can exert its pressure on the rivet by releasing the said rivet from the springs 29 which retain it in correspondence to the discharge 30 held by the springs 29. FIGS. 5 and 6 illustrate the machine subject of the present invention when it performs the die-cutting function. In this embodiment the lower end 24 of the mobile shaft 21 carries a multiple function head 33, while the lower support 2 carries an adjustable self-centring die 34.

In this embodiment the rivet feeder can be removed, since it is unnecessary.

FIGS. 7, 8 and 9 represent the present machine when it operates as a bench riveting machine, with a mechanical or pneumatic control, or supported by a pedestal 16. In this embodiment the machine includes the head 20, the mobile shaft 21, supporting at its lower end 24 a punch 35 for rivets and a rivet feeder 13 of the controlled single drop type, fixed to the fulcrum 27 of head 20.

The feeder 13, includes a rivet container, a feed channel 14 and a system that controls the fall of a single rivet at each descent of the mobile shaft 21. The control system of the rivet drop includes a pin 38 having a londitudinal groove 36 with a half-moon shape, located in the channel 14 and perpendicular to it. The end of a yoke 37 is fixed to the end of the said pin. The mobile shaft 21 has a bracket 31 in its central section which acts on the free end of the yoke 37. In the descent phase of the mobile shaft 21, the yoke 37 is moved against the effect of a spring, causing the pin 38 to rotate. During this rotation, the rivet that is in a position corresponding to the groove 36 is guided and made to pass into the lower part of the channel 14. The rivet descends under gravity and positions itself in the centring yoke or centering pliers 39 of a riveting holder 40, laterally fixed to the head 20 on the opposite side to the channel 14. An air jet originating from the nozzle 41, helps to guide the rivet to the end of its descent in the channel 14 and during its alignment in the yoke or pliers 39.

The yoke or pliers 39 is aligned and guided in its descent by the mobile shaft 21, while a spring 42 returns the holder 40 to its initial position at the return of the mobile shaft 21.

The branches of the yoke 39 are held together by a spring 43 and widen out to allow the rivet to pass, through the action of the pressure exerted on by the end 24 by punch 35 of the mobile shaft 21. If the matrix 4 is fixed on a cantilever support 2, the machine can operate as a riveting machine, or to apply studs, or pressure buttons for internal parts of clothing, as for example internal pockets.

Analogously to the embodiments described above, it is possible to replace, or suitably combine the accessories, or tools, on the head 20, hence causing the machine to assume different structures and different applications and processes.

The multi-purpose machine as described in this invention, in addition for each embodiment, can be of the bench type 17, or supported by a pedestal adjustable in height 16.

Furthermore, the various embodimetns can be controlled with a mechanical system 6, with a pneumatic system, or electrically. All the possible embodiments of the machine pre-arranged for the application of metallic, or non-metallic workpieces consisting of a single part, or a single process are fully automatic.

The embodiments which foresee the application of workpieces consisting of two elements combinable by pressure, are however semi-automatic, hence for these embodiments one of the workpieces is pre-arranged by hand on one of the matrixes while the other element is automatically discharged by a container, as described above.

It is understood that the foregoing general and detailed descriptions are explanatory of the present invention and are not to be interpreted as restrictive of the scope of the following claims.

What we claim is:

1. A multi-purpose machine for the application of metallic and non-metallic workpieces which can be positioned on a pedestal, table or in a processing line, said machine comprising:
   (a) a head including a fixed tool holder and a movable tool holder;
   (b) an exchangeable pair of associated tools held by said fixed and movable tool holders, said movable tool holder carrying a punch and said fixed tool holder carrying an associated matrix;
   (c) means for moving said movable tool holder towards said fixed tool holder;
   (d) a detachable, single drop type feeder including a rivet container, a feed channel, and means for controlling the fall of a single rivet comprising a rotatable pin transversely disposed in said feed channel having a longitudinal groove therein, and means operatively connecting said rotatable pin with said movable tool holder to cause said pin to rotate and allow the passage thereby of a rivet during the approaching phase of the movable tool holder towards the fixed tool holder; and
   (e) a rivet holder detachably fixed to said head opposite said feed channel and having a centering yoke.

2. A multi-purpose machine for the application of metallic and non-metallic workpieces which can be positioned on a pedestal, table or in a processing line, said machine comprising:
   (a) a head including a fixed tool holder and a movable tool holder;
   (b) a plurality of pairs of associated tools, each tool pair being adapted to be held by said fixed and movable tool holders, said movable tool holder carrying one tool of an associated pair of tools and said fixed tool holder carrying the other tool of the associated pair;
   (c) means for moving said movable tool holder towards said fixed tool holder;
   (d) a detachable, single drop type feeder including a rivet container, a feed channel, and means for controlling the fall of a single rivet comprising a rotatable pin transversely disposed in said feed channel having a longitudinal groove therein, and means operatively connecting said rotatable pin with said movable tool holder to cause said pin to rotate and allow the passage thereby of a rivet during the approaching phase of the movable tool holder towards the fixed tool holder; and
   (e) a riventing holder detachably fixed to said head opposite said feed channel and having a centering yoke.

3. The multi-purpose machine as defined in claim 2, which further includes biasing means for biasing said movable tool holder away from said fixed tool holder and wherein said means for moving said movable tool holder comprises foot operated mechanical linkages.

4. The multi-purpose machine as defined in claim 2, wherein said means for moving said movable tool holder comprises a pneumatic system.

* * * * *